United States Patent
Laso-Leon et al.

(10) Patent No.: US 9,290,262 B2
(45) Date of Patent: Mar. 22, 2016

(54) METHOD FOR CREATING A VERTICAL TRAJECTORY PROFILE COMPRISING MULTIPLE ALTITUDE LEVELS

(71) Applicant: THALES, Neuilly sur Seine (FR)

(72) Inventors: Enrique Laso-Leon, Toulouse (FR); Amandine Audouy, Saubens (FR); Guillaume Meulle, Toulouse (FR); Michel Roger, Blagnac (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/186,681

(22) Filed: Feb. 21, 2014

(65) Prior Publication Data

US 2014/0244077 A1    Aug. 28, 2014

(30) Foreign Application Priority Data

Feb. 22, 2013   (FR) ...................... 13 00409

(51) Int. Cl.
```
G08G 5/02      (2006.01)
G05D 1/04      (2006.01)
B64C 19/00     (2006.01)
G05D 1/00      (2006.01)
G05D 1/06      (2006.01)
G01C 21/20     (2006.01)
G08G 5/00      (2006.01)
```
(52) U.S. Cl.
CPC ............... *B64C 19/00* (2013.01); *G01C 21/20* (2013.01); *G05D 1/0005* (2013.01); *G05D 1/0607* (2013.01); *G08G 5/0021* (2013.01); *G08G 5/0034* (2013.01)

(58) Field of Classification Search
CPC ... G05D 1/0005; G05D 1/0607; G01C 21/20; G01C 19/00; G08G 5/0034; G08G 5/0021
See application file for complete search history.

(56) References Cited

U.S. PATENT DOCUMENTS

| | | | |
|---|---|---|---|
| 5,574,647 A | 11/1996 | Liden | |
| 6,148,259 A | 11/2000 | Hagelauer | |
| 2008/0300738 A1* | 12/2008 | Coulmeau et al. | 701/3 |
| 2011/0208374 A1* | 8/2011 | Jayathirtha et al. | 701/5 |
| 2012/0078450 A1* | 3/2012 | Marche et al. | 701/6 |
| 2012/0253562 A1* | 10/2012 | Wachenheim et al. | 701/4 |
| 2012/0265374 A1 | 10/2012 | Yochum | |

OTHER PUBLICATIONS

Patron et al.; Vertical profile optimization for the Flight Management System CMA-9000 using the golden section search method; IECON 2012—38th Annual Conf. on IEEE Industrial Electronics Society; p. 8482-5488; Oct. 25-28, 2012.*

* cited by examiner

*Primary Examiner* — Michael J Zanelli
(74) *Attorney, Agent, or Firm* — Baker & Hostetler LLP (57) ABSTRACT

A method for creating a vertical trajectory profile of an aircraft by optimization of a criterion representative of a flight cost, comprises: performing a first iterative computation of a profile free of altitude constraints as long as a condition dependent on the criterion is not reached, replacing each free level of the constraint-free profile with a permitted level so as to generate an initial constrained profile comprising a plurality of permitted levels, and, for each level, an altitude change point and a plurality of speeds, and performing a second iterative computation of a profile in which the altitude levels to be reached remain constant, equal to the initial permitted levels of the initial constrained profile, as long as a condition dependent on the criterion is not reached.

21 Claims, 8 Drawing Sheets

| ○ STANDARD CRZ | ● OPTIMUM CRZ | | |
|---|---|---|---|
| CRZ FL 180 | OPT FL 180 | CI 30 | ΔFL 10 |

| STEP TO | DIST FROM PPOS | TIME | AFTER |
|---|---|---|---|
| FL 200 | 600 NM | 12:00 | AAAAA/65 NM |
| FL 220 | 1200 NM | 13:15 | CCCCC/00 NM |
| FL 240 | 1800 NM | 14:30 | KKKKK/20 NM |
| FL 260 | 2400 NM | 15:45 | LLLLL/10 NM |
| FL 300 | 3000 NM | 17:00 | NNNNN/50 NM |

COMPARISON WITH CURRENT PROFILE

| FUEL AT DEST | CURRENT FUEL AT DEST |
|---|---|
| 5300 KG | 5000 KG |
| ETA AT DEST | CURRENT ETA AT DEST |
| 19:00 | 19:45 |

CANCEL  INSERT IN TMPY

METHOD FOR CREATING A VERTICAL TRAJECTORY PROFILE COMPRISING MULTIPLE ALTITUDE LEVELS

CROSS-REFERENCE TO RELATED APPLICATION

This application claims priority to foreign French patent application No. FR 1300409, filed on Feb. 22, 2013, the disclosure of which is incorporated by reference in its entirety.

FIELD OF THE INVENTION

The present invention relates to the field of Flight Management Systems (FMS) or of mission preparation, from the Electronic Flight Bag (OIS/EFB) function.

More particularly, the invention relates to functions of these systems related to the optimization of direct flight operational costs, for example fuel consumption, flight time or CO2/Nox emissions during the aircraft cruising phase.

BACKGROUND

Fuel savings and reducing emissions of certain gases are a major issue for airlines and therefore for pilots. The new taxes on emissions are prompting the airlines to take this issue into consideration. The problem faced is how to assist the crew in saving on fuel and minimizing the emissions by offering it a vertical cruising trajectory that is optimized through several altitude changes. Since the aerodynamic efficiency of aeroplanes is better at altitude, there is generally an interest in flying as high as possible. However, since a heavy aeroplane exhibits worse performance levels when climbing, the optimum altitude produces a trade-off between these two conflicting aspects: it therefore increases during the flight, as the aeroplane becomes lighter. A number of operational solutions currently exist for approaching this optimum altitude.

It should be recalled that a flight plan comprises a succession of geographic latitude and longitude points, called waypoint (WP). From the waypoints, a lateral trajectory is generated by the FMS, and from this lateral trajectory, a vertical trajectory, called vertical profile, is computed by the FMS, taking into account any altitude, speed, time or other such constraints.

The complete vertical profile is broken down into three phases:
a climb phase from the departure airport to a first altitude level,
a succession of altitude levels to be reached and of associated altitude change points, called "steps", generally identified on curvilinear abscissa along the vertical profile, for example in relation to the remaining distance to be travelled to arrive at the destination ("distance to destination"). This phase constitutes the cruising phase,
a descent phase from the last altitude level to the arrival airport.

A first solution is a determination of flight level changes filed in the flight plan by the airlines. To this end, the airlines generally propose, in the flight plans determined in the preparation phase, the optimum levels in the cruising phase, as well as the geographic waypoints (WP) at which these level changes must be initiated, commonly called steps. The disadvantage is that the pilots do not generally appreciate this solution because the steps are forced to be performed at geographic points which are unrelated to the vertical flight plan. This does not necessarily constitute an optimum solution because these are purely geographical points which have no meaning for the vertical trajectory.

A second solution is to indicate the value of the optimum flight level during the flight. A computer onboard the aeroplane determines in real time the instantaneous optimum aerodynamic level as a function of the weight of the aeroplane and the pilot can follow the changes of this level to modify its vertical trajectory. This solution does not offer the possibility of an advance planning of the trajectory followed by the aeroplane to the end of the cruising phase. Moreover, it supplies an altitude based only on the aerodynamic efficiency of the aeroplane and the instantaneous wind and is not able to take account of the changes in the wind along the trajectory, which can penalise actual consumption.

A third solution is an embedded function called "Optimum Step" (OPT STEP) currently implemented in certain onboard computers for an aircraft. This function is used during the flight and assists the crew in terms of optimization of fuel consumption during the cruising phase. This function computes the optimum altitude changes (optimum steps) where there is a change from one cruising altitude to another. This change can be made without preference to a lower or higher altitude. The computed step can take place at a specific waypoint of the flight plane (geographic step) or at a point computed by the FMS which does not correspond to a waypoint.

The computation is performed by successive tests for different level change abscissa values. An estimation of the direct operational costs is computed for each abscissa tested, and the value retained is the one for which the cost is lowest.

The new fuel consumption is computed for a single level, corresponding to a step between the current level and an optimum level entered manually by the pilot. The optimization consists only in choosing the moment at which the transition between the current level and the level requested by the pilot has to be made. The computation of the new consumption is displayed to the pilot, who must mentally make the comparison with the consumption without optimization. A drawback of this OPT STEP function is that the optimization is performed on the assumption that the aeroplane remains on the new level until the end of the flight. This function therefore represents a short range optimization of the consumption and with low guarantee.

The graphical interfaces of the embedded systems of FMS type include a page which makes it possible to display the computed steps by giving the cost/gain information associated with the step independently of its type.

The display of the steps respects their chronological order of appearance along the flight plan, the information on the distance remaining before the step is displayed for each waypoint belonging to the active flight plan. When the point of initialization of a step approaches, a "STEP AHEAD" message is displayed on the page in order to warn the crew.

A disadvantage of this solution is that the crew performs steps but has no knowledge of the total gains that it will be able to obtain at the end of cruising. Furthermore, only one optimum step at a time can be taken into account in the computation, which does not make it possible to optimumly anticipate the next altitude changes.

An improvement of the "Optimum step" function is described in the document U.S. Pat. No. 5,574,647.

The proposed method consists in determining an altitude profile that minimizes the direct operational costs. For this, the optimum altitude level (commonly called flight level) that minimizes the direct operational costs is computed instantaneously, that is to say without taking into account what will happen later. This instantaneous optimum flight level is determined using meteorological data, the weight of the aeroplane, and its speed. To this is added a filtering technique so as to inhibit step phases within an excessively short level.

According to this document, the online determination of the optimum cruising altitude (given a speed) cannot be performed, in as much as a plurality of minima can exist, which would entail the use of enumerative methods that are costly in terms of computation time.

This method does not optimize the speed along the cruising phase. The latter is pre-computed in the form of "Econ-Speeds" charts.

Furthermore, this method is based on an optimization at each instant of the altitude, which does not necessarily correspond to an optimization of all of the cruising trajectory.

SUMMARY OF THE INVENTION

The aim of the present invention is to remedy the above-mentioned drawbacks by proposing a method for computing a cruising profile that makes it possible to optimize a flight cost over a complete trajectory portion in a reliable manner.

According to one aspect of the invention, the subject of the present invention is a method for creating a vertical trajectory profile of an aircraft by optimization of a criterion representative of a flight cost, a trajectory being computed from an ordered list of waypoints contained in the flight plan, a vertical profile associated with the trajectory being defined by the following parameters:
a plurality of successive altitude levels to be reached by the aircraft,
for each level: an altitude change point (xi) between a current level and a next level and a plurality of speeds (Mi-k) observing an aircraft speed trend law on the level considered, the method comprising the steps consisting in:
loading a portion of trajectory for which the profile is to be optimized,
loading at least one criterion parameter,
loading at least one value representative of permitted altitude levels,
initializing a first iterative computation by an initial profile,
performing a first iterative computation of a profile free of altitude constraints as long as a condition dependent on the criterion is not reached, comprising the substeps consisting in:
    computing the criterion corresponding to the current profile using a function performing a digital integration of the trajectory,
    incrementing the parameters by a parametric optimization method,
loading the constraint-free profile obtained as output from the first iterative computation, comprising a plurality of successive levels, and, for each level, an altitude change point and a plurality of speeds,
replacing each free level of the constraint-free profile with a permitted level so as to generate an initial constrained profile comprising a plurality of permitted levels, and, for each level, an altitude change point and a plurality of speeds,
loading the initial constrained profile to initialize a second iterative computation,
performing a second iterative computation of a profile in which the altitude levels to be reached remain constant, equal to the initial permitted levels of the initial constrained profile, as long as a condition dependent on the criterion is not reached, comprising the substeps consisting in:
    computing the criterion corresponding to the current constrained profile using a function performing a digital integration of the trajectory,
    incrementing the parameters by a parametric optimization method.

Advantageously, the method according to the invention also comprises a step consisting in loading waypoints of the portion of trajectory between which a change of altitude is prohibited.

Advantageously, the step of loading waypoints of the portion of trajectory between which a change of altitude is prohibited is performed by the display of a list of all the waypoints of the trajectory and of an associated toggle switch enabling the crew to choose either to authorize or to inhibit the change of level for the flight segment following the waypoint.

Advantageously, a designation of a waypoint as being inhibited leads to the inhibition of all the subsequent points in the list and an authorization of a waypoint previously inhibited leads to an authorization of all the subsequent waypoints in said list.

Advantageously, at least one loading step preceding the initialization step is performed by the crew via a human-machine interface.

Advantageously, the initialization profile is defined by a constant initialization altitude level and a constant initialization speed.

Advantageously, the initialization step comprises the substeps consisting in:
loading a minimum initialization altitude level and a maximum initialization altitude level,
loading a minimum initialization speed and a maximum initialization speed,
performing a computation of the criterion for a profile comprising a single altitude level and a constant speed for a set of pairs of altitude and speed values respectively lying between the minimum level and the maximum level and the minimum speed and the maximum speed,
selecting a pair of altitude and speed values on the basis of a condition dependent on the criterion.

Advantageously, the aircraft speed trend law on an altitude level is a linear law.

Advantageously, the digital integration of the trajectory integrates a speed of the aeroplane computed from wind and temperature data associated with the flight level considered and loaded automatically without the intervention of the pilot.

Advantageously, the value representative of permitted altitude levels is a minimum deviation between two permitted altitude levels.

According to one embodiment, the portion of trajectory to be optimized corresponds to all of a cruising phase.

According to another embodiment, the portion of trajectory to be optimized is determined in flight, from the current position of the aircraft.

According to a variant, the function performing a digital integration of the trajectory is a module integrated in the flight management system.

According to a variant, the method according to the invention also comprises a step consisting in displaying a final constrained vertical profile obtained as output from the second iterative computation, the display comprising at least a plurality of permitted successive levels, and, for each level, an altitude change point.

Advantageously, the step of displaying a final constrained vertical profile comprises the display of a list comprising the following columns:
a STEP TO column corresponding to the next altitude level to be flown,
a DIST FROM PPOS column corresponding to the distance to the altitude change point from a current position, a TIME column corresponding to the universal time at which the change of altitude must begin, an AFTER column corresponding to the waypoint immediately preceding the change of altitude with an indication of a distance from the change to this waypoint.

According to a variant, the method according to the invention also comprises a step of displaying a result of the computation of the cost criterion obtained for the final constrained vertical profile Advantageously, the method according to the invention also comprises a step consisting in displaying the following data:

result of the computation of the cost criterion for the current trajectory, time of arrival for the current trajectory and for the optimized trajectory, remaining fuel at the destination airport for the current trajectory and for the optimized trajectory.

Advantageously, the method according to the invention also comprises a step performed by the pilot consisting in validating the computed final constrained profile corresponding to a step of insertion of the profile into a temporary flight plan.

According to another aspect of the invention, the subject of the invention is a device for creating a vertical trajectory profile of an aircraft by optimization of a criterion representative of the flight cost, a trajectory being computed from an ordered list of waypoints contained in the flight plan, a vertical profile associated with the trajectory being defined by the following parameters:

a plurality of successive altitude levels to be reached by the aircraft for each level: an associated altitude change point between a current level and a next level and a plurality of speeds observing an aircraft speed trend law on the level considered, the device comprising:

means for loading:

a portion of trajectory for which the profile is to be optimized, waypoints of said portion of trajectory between which a change of altitude is prohibited, at least one criterion parameter, at least one value representative of the permitted flight levels, an initialization module computing an initial vertical profile defined by a constant initialization altitude level and a constant initialization speed, for a first iterative computation, a module for performing the first iterative computation of a vertical profile free of constraints as long as a condition dependent on the criterion is not reached, a module for replacing each free level of the constraint-free profile with a permitted level so as to generate an initial constrained profile, a module for performing a second iterative computation of a constrained vertical profile as long as a condition dependent on the criterion is not reached, initialized by the initial constrained profile.

Advantageously, the device according to the invention also comprises a module for displaying a final constrained vertical profile obtained as output from the second iterative computation and the result of the computation of the criterion obtained for the final constrained vertical profile.

Advantageously, a module for performing an iterative computation comprises:

a trajectory computer using digital integration and for computing associated criterion, a parametric optimizer.

According to another aspect of the invention, the subject of the invention is a computer program product, the computer program comprising code instructions making it possible to perform the steps of the method according to the invention when the program is executed on a computer.

BRIEF DESCRIPTION OF THE DRAWINGS

Other features, aims and advantages of the present invention will become apparent on reading the following detailed description and in light of the appended drawings, given as nonlimiting examples and in which.

DETAILED DESCRIPTION

Figure 1:
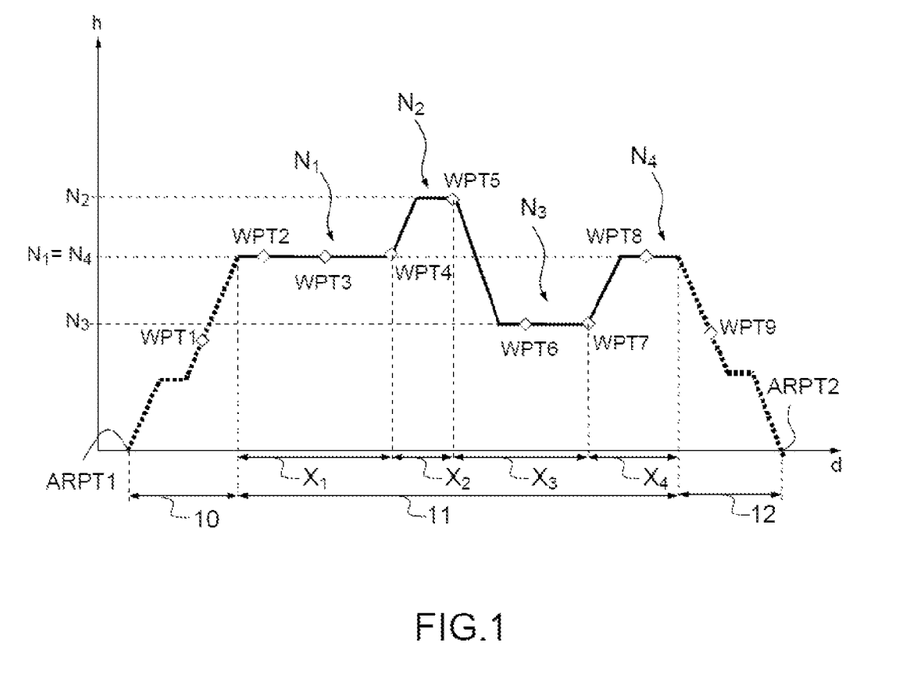
FIG. 1 illustrates an example of a computed vertical trajectory profile according to the invention.

FIG. 1 illustrates an example of a vertical trajectory profile computed according to the invention. The phase 10 corresponds to the climb phase, the phase 11 to the cruising phase and the phase 12 to the descent phase.

This vertical profile is computed from a lateral trajectory computed by the FMS and involving an ordered list of waypoints WPT from the flight plan.

The vertical profile comprises a plurality of altitude levels Ni (commonly called level), i being the index, for example in FIG. 1: N1, N2, N3 and N4. These levels are altitude levels to be reached by the aircraft. Once the level Ni is reached, the aircraft flies at the altitude Ni until the level change point defined by a distance xi, between the level i and the next level i+1.

The distances xi identify the length of the altitude levels Ni. As an example, xi can correspond to a curvilinear abscissa or, as illustrated in FIG. 1, to the length, distance-wise, of a level Ni: x1 is the length of the level N1, x2 the length of the level N2, etc. A change of level is commonly called level jump.

Each level Ni is flown by the aircraft according to a given speed law. Thus, to define the speed of the aircraft at any instant, a speed trend law has to be defined for each level. In a preferred variant, the law is identical for all the levels. To describe the speed of the aircraft without ambiguity at any instant, a plurality of k speed values per level i (Mi-k) observing the trend law are necessary.

According to a preferred embodiment, the speed variation law on a level is linear, and two speed values, respectively an initial speed Mi-ini and a final speed Mi-fin make it possible to determine the linear speed variation along the level i. The speed is conventionally expressed in number of Mach, corresponding to the ratio between the speed of the aircraft and the speed of sound.

ARPT1 and ARPT2 correspond respectively to the departure airport and to the arrival airport.

FIG. 1 also shows the waypoints WPT1 to WPT9 of the flight plan which are flown over by the aircraft.

The aim of the method according to the invention is to compute a cruising vertical trajectory profile that is optimized in relation to a criterion C representative of an operational flight cost. The method thus computes an optimized vertical profile defined on the basis of altitudes levels to be reached, and, for each level, on the basis of waypoints and of speed values that observe a predetermined trend law.

Figure 2:
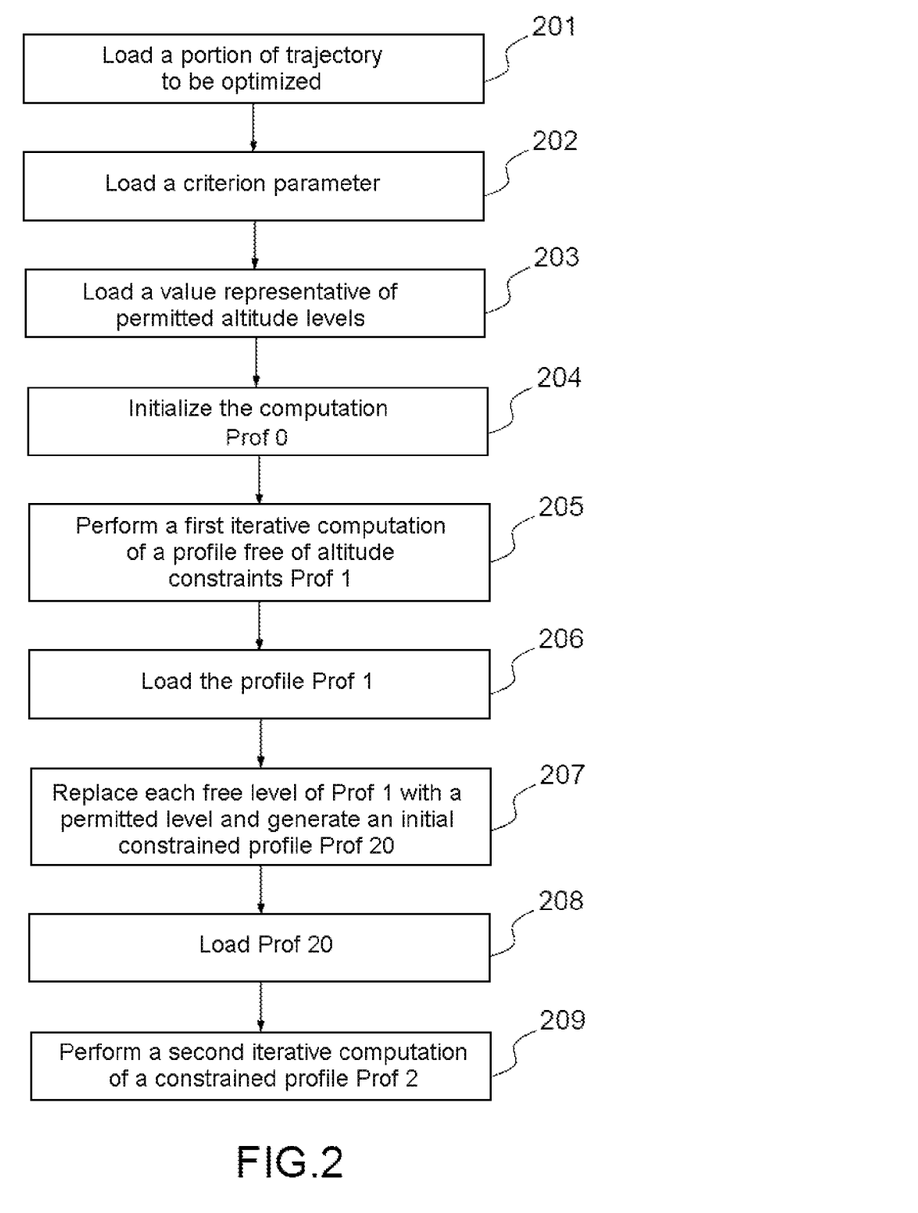
FIG. 2 describes the steps of the method according to the invention.

The steps of the method according to the invention are schematically represented in FIG. 2.

In a first step 201, the method makes it possible to load the portion of trajectory for which the vertical profile is to be optimized.

According to a first option, all of the cruising phase is involved, the portion of trajectory to be optimized then includes all the waypoints of the cruising phase. The loading step is then performed on the ground.

According to a second option, the portion of trajectory to be optimized is determined in flight, and, for example, has as starting point the current position of the aircraft. In this case, the portion of trajectory includes the waypoints of the cruising phase remaining to be flown over by the aircraft.

According to another option, the starting point is loaded by the pilot.

Typically, the end of the portion of trajectory to be optimized is determined by the constraints linked to the approach to the arrival airport, for example the cruising end point which devolves from these constraints.

In a step 202, the method makes it possible to load at least one criterion parameter.

The criterion C representative of an overall cost with which the optimization works is computed using at least one criterion parameter CI.

By generalizing, the overall cost is a function of a plurality of different individual costs and the criterion parameter makes it possible to introduce a weighting of these different individual costs.

A conventional example is an overall cost C that is a function of the cost of the fuel (function of the fuel consumption of the flight) and of the cost of the flight time.

C=[quantity of fuel (kg)]*(cost of a kg of fuel)+[number of flight hours (hours)]*(cost of a flight hour)

Optimizing C is equivalent to optimizing C' defined by:

C'=quantity of fuel (kg)+[cost of a flight hour/cost of a kg of fuel]*number of flight hours (hours)], i.e.:

C'=[quantity of fuel (kg)+K*number of flight hours (hours) with

K=cost of a flight hour/cost of a kg of fuel

K is conventionally a criterion parameter called Cost Index, and its value is set, for example, by the airline according to a chosen cost policy.

Thus, an optimization on this conventional criterion C (or C', which is equivalent) enables the method according to the invention to find a vertical profile that produces a trade-off between fuel consumed and flight time to minimize the overall cost of the flight in accordance with a cost policy set by the airline.

The invention makes it possible to introduce into the overall cost criterion other types of individual costs that are components of this cost, for example a component linked to the CO2 emissions and/or to the nitrogen oxide NOx emissions.

In this case, the cost is formulated for example:

C=CI1*quantity of CO2+CI2*quantity of Nox+CI3*quantity of fuel+CI4*number of flight hours.

In this example, the individual costs are quantities, and: CI1 is expressed in €/kg, CI2 in €/kg, CI3 in €/kg and CI4 in €/h. These values could, for example, represent the taxes that an airline would pay on the CO2 or NOx, or else arbitrary values chosen by the airline according to its environmental policy if it wants to reduce its pollutant emissions.

One benefit of these new cost components and associated criterion parameters is that they take into account emissions of pollutants in the flight costs, and thus reduce their emission by the optimization method according to the invention.

By generalizing, an overall cost criterion C is defined as a function of a plurality of individual costs C1, C2, C3 ..., called components, each being weighted by a parameter value CI1, CI2, CI3 ... : C=CI1*C1+CI2*C2+CI3*C3+ ....

The step 202 of loading of the criterion parameters makes it possible to choose the values of CI1, CI2, ... to be used for the computation of the overall cost criterion C.

According to a variant, these values are loaded by the pilot.

According to another variant, these values are predetermined.

The different criterion parameter values can all be entered, or else, for example, a 0 can be entered for a value CIi making it possible to not take account of the corresponding cost Ci.

In a step 203, the method according to the invention makes it possible to load at least one value representative of permitted altitudes levels. This representative value makes it possible to take into account, when creating the vertical profile, air regulations. For example, this representative value is expressed by a value ΔFL corresponding to a minimum deviation between two successive permitted altitude levels to be reached (level jumps).

This value can vary according to the position of the aircraft along is trajectory. For example, ΔFL can be a function of the altitude level flown by the aircraft and of the airspace being crossed by the aeroplane.

According to a variant, this value (or these values) is (are) loaded by the crew.

According to another variant, these values are predetermined and correspond to a default value taking into account the constraints of the airspace being crossed (for example RVSM space or non-RVSM space, RVSM standing for "Reduced Vertical Separation Minima").

In a step 204, the method makes it possible to initialize a first iterative computation by computing an initial profile Prof0. Different options and computations are possible to obtain an initial profile Prof0.

According to one embodiment, the initial profile Prof0 comprises a constant initialization altitude level N0 and a constant initialization speed M0, and altitude change points xi according to any predetermined meshing. The complete initialization profile thus comprises an initial climb to the level N0, a cruise at constant level N0 to a point according to which the aircraft must initialize its descent, called Top of Descent.

In a step 205, the method makes it possible to perform a first iterative computation of a profile Prof1 free of altitude constraints as long as a condition dependent on the criterion C is not reached, comprising the substeps consisting in:
computing the criterion C corresponding to the current profile using a function performing a digital integration of the trajectory,
incrementing the parameters by a parametric optimization method.

The computed profile Prof1 is defined by the altitude levels N1i, the altitude change points x1i, and a plurality of speeds M1i-k observing a speed trend law of the aircraft predetermined on the level i.

According to an example, the x1i are chosen as corresponding to curvilinear abscissa. According to another example, the x1i are chosen as corresponding to the length of a level i.

The cost criterion C is defined from at least one criterion parameter CI as described previously.

The function performing a digital integration of the trajectory uses passive description parameters from the physical model of the aircraft (from a database BDperf) and meteorological conditions (from a database BDmeteo), such as the wind values encountered by the aircraft during the flight. The computation is performed by digitally solving the equations of the mechanics of the flight in order to estimate the trajectory followed by the aircraft, and to integrate at the same time the instantaneous fuel consumption and/or the CO2 or other emissions, as a function of the chosen overall cost criterion.

One aspect of the invention is to couple a criterion computation function performing a digital integration of the trajectory with a parametric optimizer, the role of which is to adjust the parameters N1i, x1i, M1i-k in order to obtain the production of a condition on the chosen cost criterion C.

For example, a parametric optimizer comprises a loop iteratively performing the following actions:
computation of the cost criterion C for a set of parameters
computation of the gradient of the cost criterion C (partial derivatives relative to each of the parameters) for this same set of parameters
updating of the parameters with a set of parameters making it possible to obtain a lower cost criterion in the next iteration
repeating the preceding three actions until it is no longer possible to obtain a lower cost criterion. This condition consists in comparing a mathematical function against a tolerance defined by the user.
In the above example, the condition is a minimum of the gradient.

Figure 3:
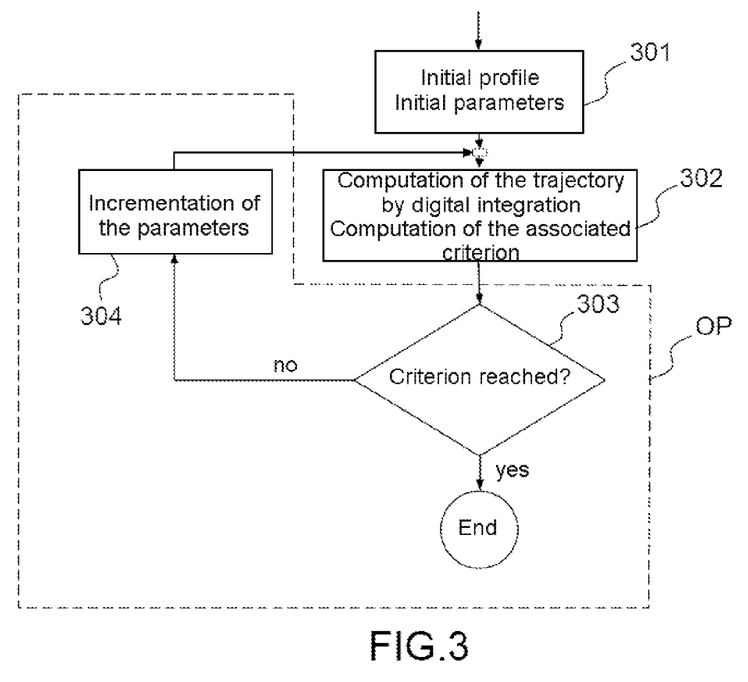
FIG. 3 generically illustrates the substeps of an iterative computation according to the invention.

FIG. 3 generically illustrates the substeps of the iterative computation according to the invention. After an initialization 301, the step 302 performs a trajectory computation by digital integration and a computation of the associated cost criterion C. Then, in 303, a check is performed to see if the condition on the criterion is reached. If it is reached, the computation is stopped, if it is not reached, the parameters are incremented by the parametric optimizer OP. Thus, the achievement of steps 303 and 304 implements the parametric optimizer OP.

The first iterative computation performed in 205 computes a profile prof1 free of altitude constraints, that is to say that all the altitude levels are possible.

Figure 4:
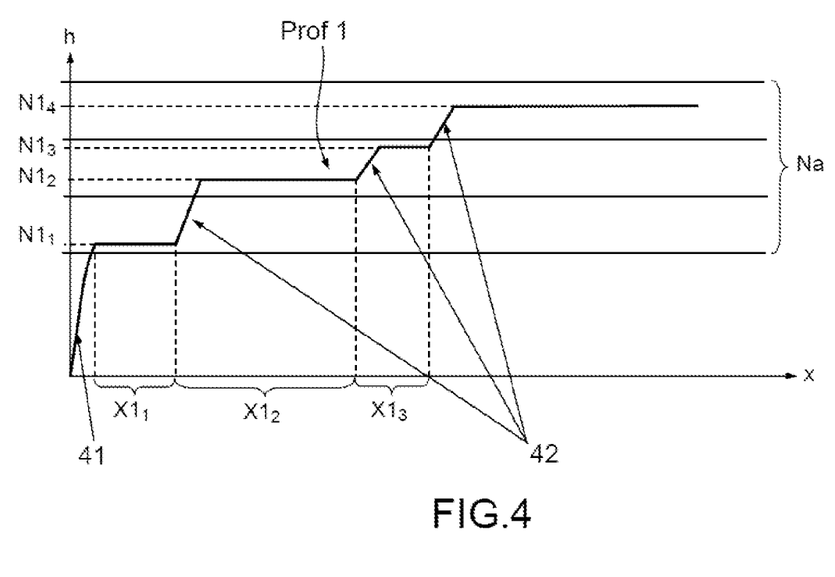
FIG. 4 illustrates the computed vertical profile output from the first iterative computation.

FIG. 4 illustrates the vertical profile Prof1 computed as output from the first iterative computation. The successive levels 1, 2, 3 have respective lengths x11, x12, x13 and any respective altitude levels N11, N12, N13, which are not a priori authorized levels Na.

In this example, the computation is performed by considering the climb 41 as a standard climb to the first level and the climbs (or descents) 42 as flight portions travelled, for example, in Open mode (CLB or DES), typically a fixed thrust regime and a servocontrolled slope.

In a step 206, the method makes it possible to perform a loading of the constraint-free profile Prof1 obtained as output from the first iterative computation. The profile Prof1 comprises a plurality of successive levels N1i, and, for each level I, an altitude change point x1i and a plurality of speeds M1i-k (k speed values).

It is appropriate now to take into account, for the computation of the final vertical profile, any air regulation constraints, loaded in the step 203 in the form of at least one value representative of permitted altitudes levels.

Figure 5:
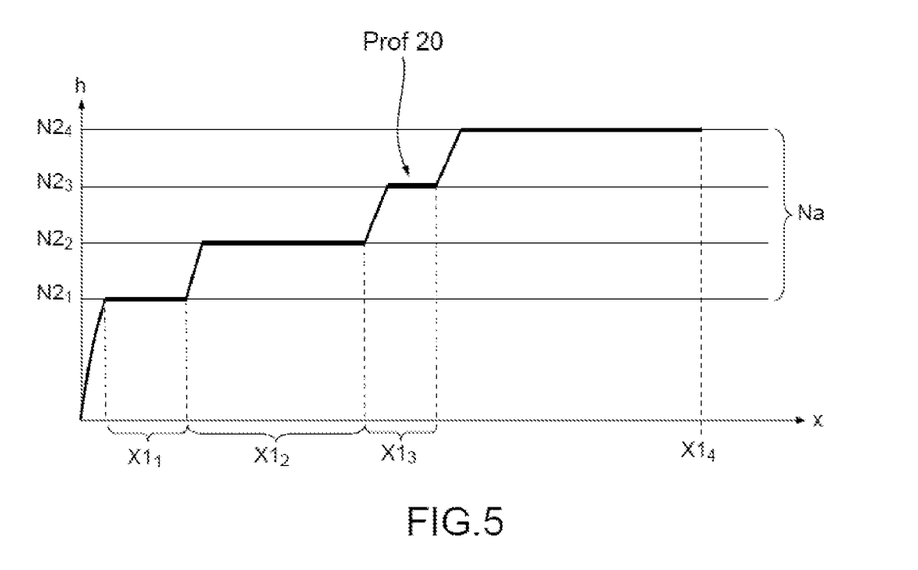
FIG. 5 illustrates an initial constrained profile.

In a step 207, the method makes it possible to replace each free level N1i of the constraint-free profile with a permitted level N20i so as to generate an initial constrained profile Prof20 illustrated in FIG. 5 comprising a plurality of permitted levels N2i, and, for each level i, an altitude change point x1i and a plurality of speeds M1i-k corresponding to the parameters xi and Mi-k of the free profile Prof1. For a level i, the permitted altitude level N20i is, for example, the permitted level closest to the constraint-free level N1i.

In a step 208, the method makes it possible to load the profile Prof20 as defined previously to initialize a second iterative computation.

In a step 209, the method makes it possible to perform a second iterative computation of a profile Prof2 in which the altitude levels remain constant, equal to the initial permitted levels N2i of the initial constrained profile prof20, as long as a condition dependent on the criterion C is not reached, comprising the substeps consisting in:
computing the criterion C corresponding to the current constrained profile using a function performing a digital integration of the trajectory,
incrementing the parameters by a parametric optimization method.

The optimization is performed according to the same principle as that described for the first iterative computation and with an identical condition. In this computation, the altitude levels are constant and determined, equal to the initial permitted levels N2i, and the optimization is performed on the parameters of level length xi and of speed on a level Mi-k.

Figure 6:
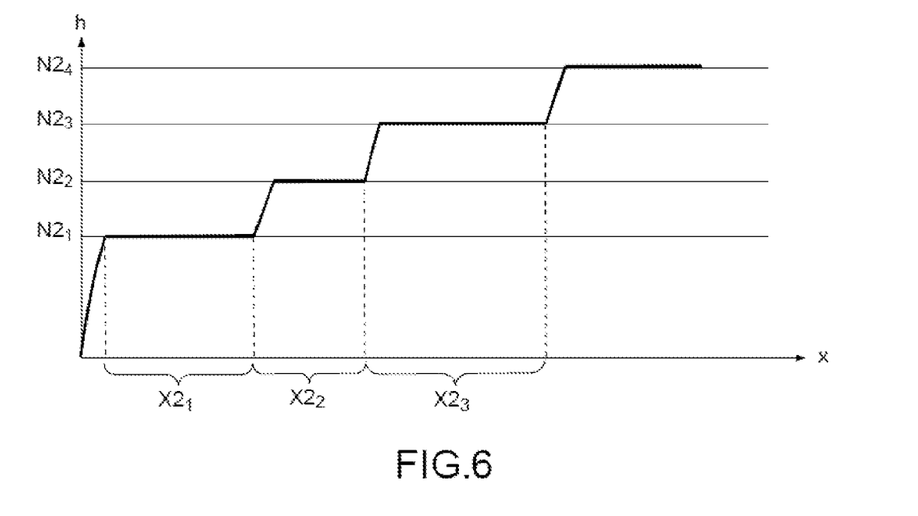
FIG. 6 illustrates a final profile obtained as output from the second iterative computation.

Thus, the final profile Prof2 obtained as output from the second iterative computation and illustrated in FIG. 6 comprises permitted levels N2i and, for each level i:
an associated altitude change point x2i between a current level i and a next level i+1,
a plurality of speeds M2i-k observing a speed trend law of the aircraft on the level considered.

Thus, the final vertical profile Prof2 comprises only authorized altitude levels.

When the value representative of permitted flight levels is defined by the parameter $\Delta FL$ defined previously, the heights of the jumps between successive authorized altitude levels N2i are multiples of $\Delta FL$.

Thus, the invention makes it possible to create a final vertical profile that is optimized according to a criterion chosen in a very efficient manner by using a function performing a digital trajectory integration and computing an associated criterion coupled with a parametric optimizer.

The optimization is performed in light of the position of several steps at the same time. All of the available meteorological information is taken into account, the optimized profile therefore has better efficiency than the profiles computed with the prior art. Furthermore, the method according to the invention proposes a plurality of altitude levels, which is not the case of the OPT STEP function, in which the level used for optimization is entered and chosen by the pilot, and is unique.

Furthermore, the invention makes it possible to create the final vertical profile by the implementation of two successive iterative computations. The implementation of two successive computations as described previously makes it possible to perform a rapid optimization by decorrelating the determination of the permitted optimum altitude levels N2i from the determination of the level change points x2i and of the speeds M2i-k. This decorrelation makes it possible to use an existing continuous optimizer, which would be very costly to redevelop, to optimize a set of parameters comprising continuous parameters (xi, Mi-k) and discrete parameters (permitted altitude levels).

Figure 7:
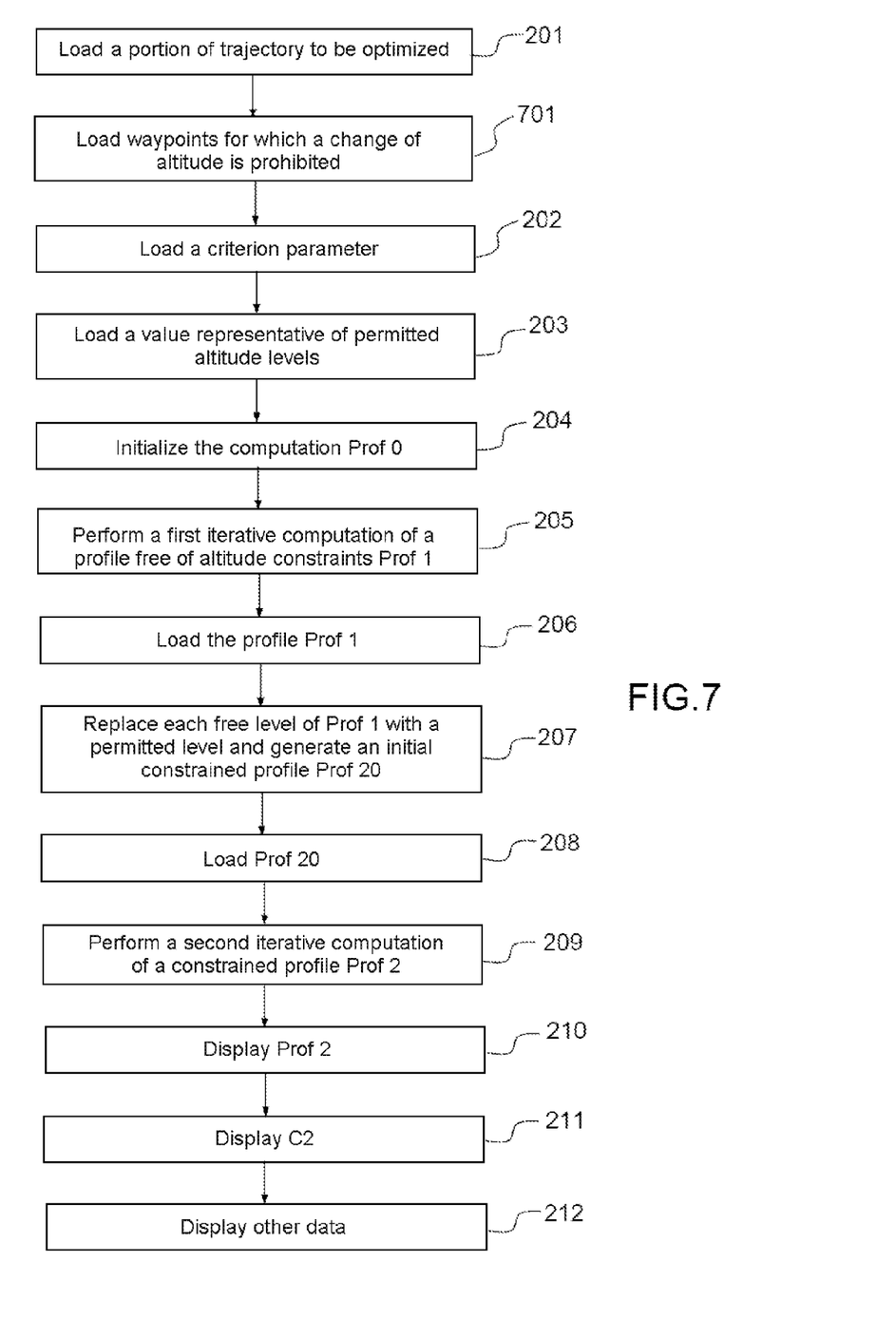
FIG. 7 illustrates the variant of the method according to the invention comprising a step making it possible to load the waypoints of the portion of trajectory to be optimized for which a change of altitude is prohibited.

In a preferred variant represented in FIG. 7, in a step 701, the method makes it possible to load the waypoints of the portion of trajectory to be optimized for which a change of altitude is prohibited. This step makes it possible to take into account the regulatory constraints specific to each geographic zone crossed by the aeroplane if such exist. Thus, if a country demands no change of flight level when it is being flown over, it is specified that a cruising segment implementing this overflight must not include any altitude change point (level jump). This step 701 is performed before the step performing the first iterative computation.

According to a preferred variant, the loading is performed by the crew.

In this case, the choices of performing a jump or not between each of the waypoints for the computation of the optimum profile are also left to the discretion of the crew.

In this case, the first and second iterative computations take account of the portions of trajectory for which the change of altitude is prohibited. Thus, the level lengths x1i and x2i and their position along the trajectory are then constrained by the existence of cruising segments with changes of altitude prohibited.

Figure 8:
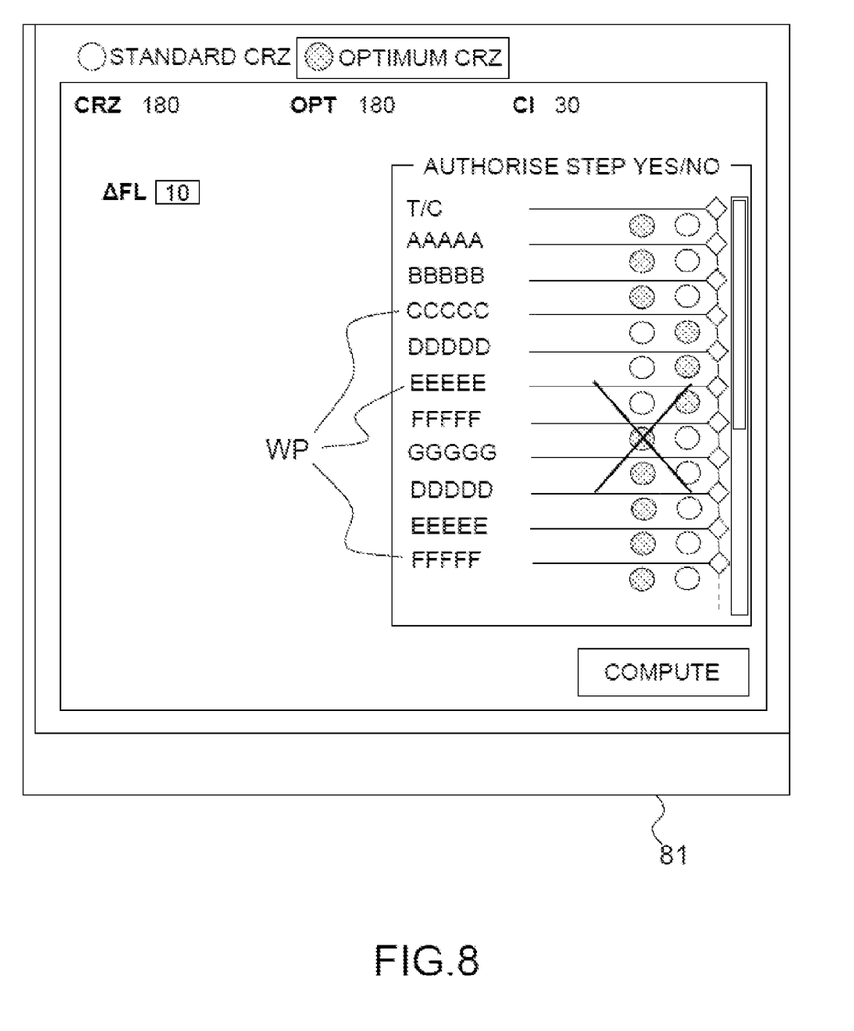
FIG. 8 illustrates a display means for the variant of the method according to the invention in which waypoints of the portion of trajectory to be optimized for which a change of altitude is prohibited are loaded.

In an embodiment of this variant for which a display example is illustrated in FIG. 8, the loading of the waypoints of the portion of trajectory to be optimized for which a change of altitude is prohibited is performed by the crew, by the display of all of the waypoints WP (list) and of an associated toggle switch 81 (yes/no radio button) enabling the crew to choose either to authorize "yes" or inhibit "no" the change of level for the flight segment following the waypoint considered.

According to one embodiment, the designation of a point as being inhibited causes all of the subsequent points in the list to be prohibited (propagation). Similarly, if an inhibited point is once again authorized, all the subsequent points will be authorized.

Thus, a designation of a waypoint as being inhibited causes all the subsequent points in the list to be inhibited and an authorization of a waypoint that was previously inhibited causes all the subsequent waypoints in the list to be authorized.

In place of this propagation logic, the pilot can authorize or inhibit a level point by point.

Alternatively, the crew can define an area of inhibition of the level jump by designating the start point of this area then the end point (with the restriction that these areas will have to be defined sequentially to avoid having to recommence operation if the chronological order was not observed).

According to one embodiment, at least one loading step preceding the initialization step 204 is performed by the crew via a human-machine interface.

For example, the pilot loads at least one value representative of permitted altitude levels. For example, he or she selects the authorized minimum ΔFL at each waypoint. Typically:
0 for a prohibited level,
X000 for each 1000 section, for example, if he or she enters the value 1000 ft, the aeroplane will make changes of altitudes which will all be multiples of 1000 ft.
"no limit" (non-constrained level).

Furthermore, the pilot can load the portion of trajectory to be optimized and/or the criterion parameters CI to be used to compute the cost criterion C.

As a variant, the initialization step 204 comprises the substeps of:
loading a minimum initialization altitude level N0min and a maximum initialization altitude level N0max,
loading a minimum initialization speed M0min and a maximum initialisation speed M0max
performing a computation of the criterion for a profile comprising a single altitude level and a constant speed for a set of pairs of altitude and speed values respectively lying between the minimum level and the maximum level and the minimum speed and the maximum speed,
selecting a pair of altitude and speed values (M0, V0) on the basis of a condition dependent on the criterion.
N0Min<N0<N0max and M0min<M0<M0max therefore applies, and there is a systematic exploration of the values of the pair (N, M) for the computation of the criterion C.

The profile that has the lowest cost is then chosen from those which have been computed during the systematic exploration.

As an example, the exploration pitch is 1000 feet for the altitude and 0.01 for the number of Mach.

The computation is performed with a point meshing in terms of predetermined altitude change points. The advantage of this initialization consists in obtaining an initialization profile representative of the profiles that an airline commonly applies, so as to have a reference cost and a physically feasible initialization (one that an aeroplane can fly) and a set of initial parameters in the area of definition of the cost function.

As a variant, the digital integration of the trajectory integrates speeds of the aeroplane computed from associated wind and temperature data for each flight level considered and loaded automatically without the intervention of the pilot. The optimizer is thus able to identify the most suitable profile parameters. Furthermore, the cost saving between the current trajectory and the optimized trajectory is generated by taking into account the winds encountered by the aircraft over all of the trajectory, which allows for a more accurate and fairer evaluation of the saving made.

Automatic loading avoids work that is tedious for the crew.

As a variant, the function performing a digital integration of the trajectory and a computation of the instantaneous consumption (and possibly a computation of the instantaneous pollutant emissions) is performed by a module integrated in the FMS. According to one embodiment, this function corresponds to the conventional PREDICTIONS function which makes it possible to take better account of the lateral trajectory because the radii of the turns are known as is the exact distance of the flight.

Once the computation of the optimum profile Prof2 has been performed, there are a number of possible options for using it.

In a futuristic vision of air navigation, it is possible to envisage that, if the cost associated with the optimized profile is better than the cost of the current profile, the optimized profile is automatically loaded into the flight plan without the intervention of the pilot.

In the current state of navigation onboard an aircraft, it is the crew onboard the aircraft which makes the decisions. It is therefore ideal in this case to present the results of the computation to the pilot. This result comprises the computed optimum profile Prof2, the value of the cost criterion C2 computed for this profile and a comparison of certain data between current trajectory and optimized trajectory. Based on the result presented, the pilot can then evaluate the efficiency of the proposed solution and make a decision on whether or not to take into account the computed optimized profile Prof2 in the flight plan of the aircraft.

Thus, in a variant, the method according to the invention comprises a step 210 consisting in displaying the final constrained vertical profile Prof2 obtained as output from the second iterative computation, this display comprising a plurality of permitted successive levels N2i, and, for each level, an altitude change point x2i, and possibly the speeds (M2i-k).

The display 210 of the constrained profile should enable the pilot to have a summary view of the complete sequence of altitude changes throughout the cruising phase, with a complete description of each of the change points: position and time at which the change must start.

According to one embodiment, the predicted wind values taken into account for the computation are also displayed for each proposed optimum altitude level N2i.

Figure 9:
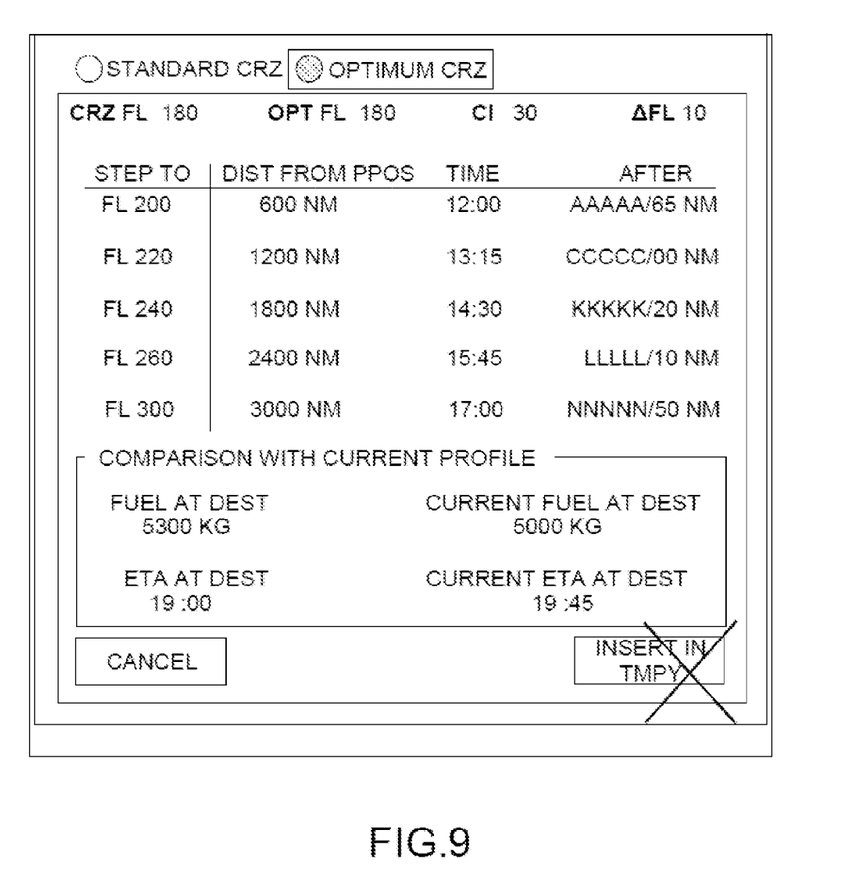
FIG. 9 illustrates an exemplary display of the characteristics of the proposed optimum profile.

FIG. 9 illustrates an example of a display of the characteristics of the proposed optimum profile. The display step 210 comprises the display of a list comprising the following columns:
a STEP TO column corresponding to the next altitude level to be flown,
a DIST FROM PPOS column corresponding to the distance to the altitude change point from a current position,
a TIME column corresponding to the universal time at which the change of altitude must begin,
an AFTER column corresponding to the waypoint immediately preceding the change of altitude with an indication of a distance from the change to this waypoint.

As a variant, the method according to the invention comprises a step 211 of displaying the result C2 of the computation of the criterion for the final constrained vertical profile Prof2.

As a variant, the method according to the invention comprises a step 212 of displaying other data such as the flight time and/or fuel remaining at destination EFOB, estimated for the optimized profile prof2.

Thus, the display step comprises the display of the following data:
result of the computation of the cost criterion for the current trajectory.
Time of arrival for the current trajectory and for the optimized trajectory.
Fuel remaining (EFOB) at the destination airport for the current trajectory and for the optimized trajectory.

The pilot can then compare the efficiency of the current flight profile and of the optimized flight profile.

The computed optimum profile is not immediately included in the active flight plan, but is subject to validation as temporary flight plan.

Thus, as a variant, the method according to the invention comprises a step of validation by the pilot of the computed final constrained profile corresponding to a step of insertion of the profile into a temporary flight plan.

The crew then has the possibility of relaunching a computation with new assumptions (for example, a new configuration of the authorized steps and/or a new ΔFL value) or of declaring the temporary flight plan applicable by activating the temporary flight plan or of cancelling all of the procedure.

Figure 10:
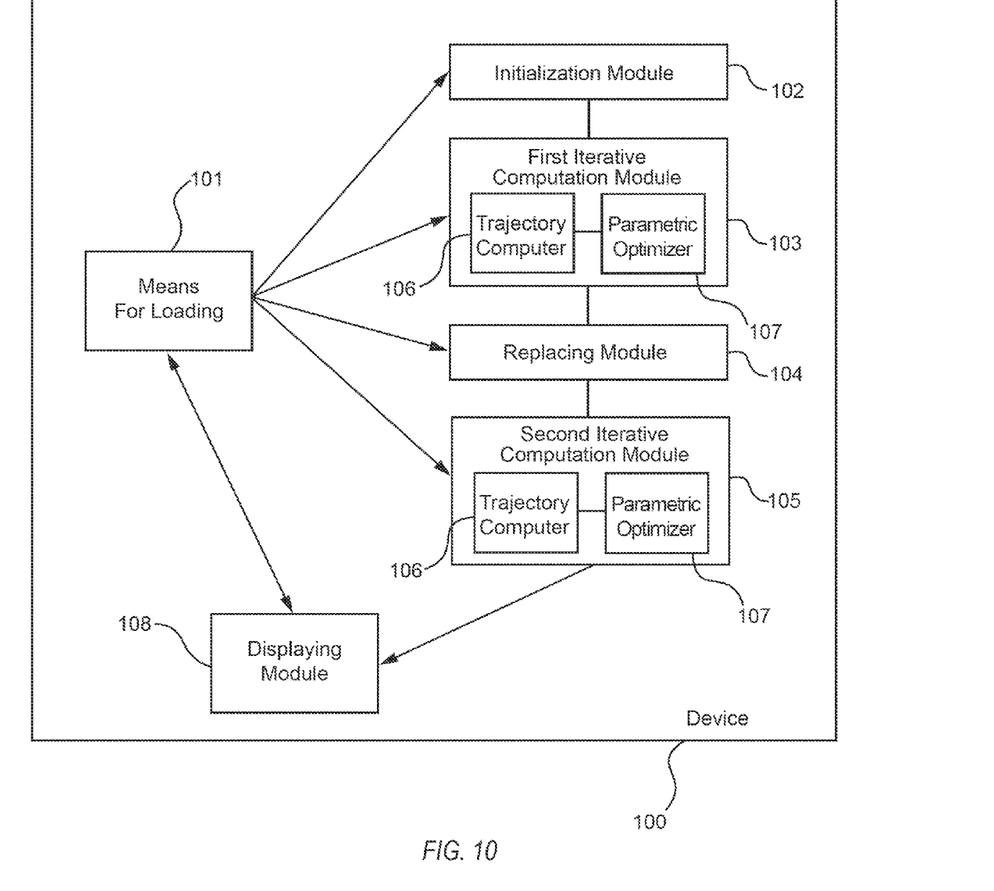
FIG. 10 illustrates a device for creating a vertical trajectory profile according to the invention.

According to another aspect of the invention, the invention relates to a device 100, illustrated in FIG. 10, for creating a vertical trajectory profile of an aircraft by optimization of a criterion C representative of the flight cost,
a trajectory being computed from an ordered list of waypoints contained in the flight plan,
a vertical profile associated with the trajectory being defined by the following parameters:
a plurality of successive altitude levels Ni to be reached by the aircraft
for each level i:
    an associated altitude change point xi between a current level i and a next level i+1,
    a plurality of speeds Mi-k observing an aircraft speed trend law on the level considered, the device comprising:
means for loading 101:
a portion of trajectory for which the profile is to be optimized,
waypoints of said portion of trajectory between which a change of altitude is prohibited,
at least one criterion parameter CI,
at least one value representative of permitted flight levels,
an initialization module 102 computing an initial vertical profile Prof0 defined by a constant initialization altitude level N0 and a constant initialization speed M0, for a first iterative computation,
a module for performing the first iterative computation 103 of a vertical profile free of constraints Prof1 as long as a condition dependent on the criterion is not reached,
a module 104 for replacing each free level N1i of the constraint-free profile Prof1 with a permitted level N2i so as to generate an initial constrained profile (Prof20),
a module for performing a second iterative computation 105 of a constrained vertical profile (Prof2) as long as a condition dependent on the criterion is not reached, initialized by the initial constrained profile Prof20.

As a variant, the device 100 comprises a module 108 for displaying a final constrained vertical profile (Prof2) obtained as output from the second iterative computation and the result of the computation of the criterion obtained for the final constrained vertical profile.

As a variant, the module for performing an iterative computation comprises:
a trajectory computer 106 using digital integration and for computing associated criterion,
a parametric optimizer 107.

According to another aspect, the invention relates to a computer program product, the computer program comprising code instructions making it possible to perform the steps of the method according to one aspect of the invention when the program is executed on a computer.

The present invention can be implemented using hardware and/or software elements. It can be available as computer program product on a computer-readable medium. The medium can be electronic, magnetic, optical, electromagnetic, or be a broadcasting medium of infrared type. Such media are, for example, semiconductor memories (Random Access Memory RAM, Read Only Memory ROM), tapes, diskettes or magnetic or optical discs (Compact Disk, Read Only Memory (CD-ROM, Compact Disk-Read/Write (CD-R/W and DVD).

The invention claimed is:

1. A method for creating a vertical trajectory profile of an aircraft by optimization of a criterion representative of a flight cost in a computer of a flight management system or of an electronic flight bag, a trajectory being computed from an ordered list of waypoints contained in a flight plan, a vertical profile associated with the trajectory being defined by a plurality of successive altitude levels to be reached by the aircraft for each level:
    an altitude change point between a current level (i) and a next level (i+1),
    a plurality of speeds observing an aircraft speed trend law on the level considered;

said method comprising:
loading a portion of trajectory for which the profile is to be optimized into a computer of a flight management system or of an electronic flight bag,
loading at least one criterion parameter into the computer of the flight management system or of the electronic flight bag,
loading at least one value representative of permitted altitude levels into the computer of the flight management system or of the electronic flight bag,
initializing a first iterative computation by an initial profile (Prof0) by the computer of the flight management system or of the electronic flight bag,
performing the first iterative computation of a profile free of altitude constraints as long as a condition dependent on the criterion is not reached by the computer of the flight management system or of the electronic flight bag, comprising the substeps:
  computing the criterion corresponding to the current profile using a function performing a digital integration of the trajectory with the computer of the flight management system or of the electronic flight bag,
  incrementing the parameters by a parametric optimization method with the computer of the flight management system or of the electronic flight bag,
loading the constraint-free profile obtained as output from the first iterative computation, comprising a plurality of successive levels, and, for each level, an altitude change point and a plurality of speeds into the computer of the flight management system or of the electronic flight bag,
replacing each free level of the constraint-free profile with a permitted level so as to generate an initial constrained profile, with the computer of the flight management system or of the electronic flight bag, comprising a plurality of permitted levels, and, for each level, an altitude change point and a plurality of speeds,
loading the initial constrained profile to initialize a second iterative computation into the computer of the flight management system or of the electronic flight bag,
performing the second iterative computation of a profile, with the computer of the flight management system or of the electronic flight bag, in which the altitude levels to be reached remain constant, equal to the initial permitted levels of the initial constrained profile, as long as a condition dependent on the criterion is not reached, comprising the substeps:
  computing the criterion corresponding to the current constrained profile using a function performing a digital integration of the trajectory, and
  incrementing the parameters by a parametric optimization method,
displaying a final constrained vertical profile obtained as output from the second iterative computation, said display comprising at least a plurality of permitted successive levels, and, for each level, an altitude change point, and
proposing to a pilot insertion of the computed final constrained vertical profile into a temporary flight plan.

2. The method according to claim 1, also comprising a step consisting in loading waypoints of said portion of trajectory between which a change of altitude is prohibited.

3. The method according to claim 2, in which the step of loading waypoints of said portion of trajectory between which a change of altitude is prohibited is performed by the display of a list of all the waypoints of the trajectory and of an associated toggle switch enabling the crew to choose either to authorize or to inhibit the change of level for the flight segment following the waypoint.

4. The method according to claim 1, further comprising designating a waypoint as being inhibited, which leads to inhibition of all the subsequent points in the list and an authorization of a waypoint previously inhibited leads to an authorization of all the subsequent waypoints in the list.

5. The method according to claim 1, in which at least one loading step preceding the initialization step is performed by the crew via a human-machine interface.

6. The method according to claim 1, in which the initialization profile is defined by a constant initialization altitude level and a constant initialization speed.

7. The method according to claim 6, in which the initialization step comprises the substeps:
  loading a minimum initialization altitude level and a maximum initialization altitude level,
  loading a minimum initialization speed and a maximum initialization speed,
  performing a computation of the criterion for a profile comprising a single altitude level and a constant speed for a set of pairs of altitude and speed values respectively lying between the minimum level and the maximum level and the minimum speed and the maximum speed,
  selecting a pair of altitude and speed values on the basis of a condition dependent on the criterion.

8. The method according to claim 1, in which the aircraft speed trend law on an altitude level is a linear law.

9. The method according to claim 1, in which the digital integration of the trajectory to the current constrained profile integrates a speed of the aircraft computed from wind and temperature data associated with the flight level considered and loaded automatically without the intervention of the pilot.

10. The method according to claim 1, in which the value representative of permitted altitude levels is a minimum deviation between two permitted altitude levels.

11. The method according to claim 1, in which the portion of trajectory to be optimized corresponds to all of a cruising phase.

12. The method according to claim 1, in which the portion of trajectory to be optimized is determined in flight, from the current position of the aircraft.

13. The method according to claim 1, in which the function performing a digital integration of the trajectory is a module integrated in the flight management system.

14. The method according to claim 1, in which the step of displaying a final constrained vertical profile comprises the display of a list comprising the following columns:
  a STEP TO column corresponding to the next altitude level to be flown,
  a DIST FROM PPOS column corresponding to the distance to the altitude change point from a current position,
  a TIME column corresponding to the universal time at which the change of altitude must begin,
  an AFTER column corresponding to the waypoint immediately preceding the change of altitude with an indication of a distance from the change to this waypoint.

15. The method according to claim 1, also comprising a step consisting in displaying a result of the computation of the cost criterion obtained for the final constrained vertical profile.

16. The method according to claim 1, further comprising:
  determining a time of arrival for the current trajectory and for the optimized trajectory;

determining remaining fuel to the destination airport for the current trajectory and for the optimized trajectory; and displaying the following data:
a result of the computation of the cost criterion for the current trajectory,
the time of arrival for the current trajectory and for the optimized trajectory, and
the remaining fuel to the destination airport for the current trajectory and for the optimized trajectory.

17. The method according to claim 1, also comprising a step performed by the pilot consisting in validating the computed final constrained vertical profile corresponding to a step of insertion of the profile into a temporary flight plan.

18. A computer program product, said computer program comprising code instructions making it possible to perform the steps of the method according to claim 1, when said program is executed on a computer of a flight management system or of an electronic flight bag.

19. A device in combination with a flight management system or an electronic flight bag for creating a vertical trajectory profile of an aircraft by optimization of a criterion representative of a flight cost, a trajectory being computed from an ordered list of waypoints contained in a flight plan, a vertical profile associated with the trajectory being defined by a plurality of successive altitude levels to be reached by the aircraft for each level:
an associated altitude change point between a current level and a next level,
a plurality of speeds observing an aircraft speed trend law on the level considered;
said device comprising:
loading means configured to load into a computer of the flight management system or of the electronic flight bag:
a portion of trajectory for which the profile is to be optimized,
waypoints of said portion of trajectory between which a change of altitude is prohibited,
at least one criterion parameter,
at least one value representative of the permitted flight levels, the computer of the flight management system or of the electronic flight bag configured to execute an initialization module to compute an initial vertical profile (Prof0) defined by a constant initialization altitude level and a constant initialization speed, for a first iterative computation, the computer of the flight management system or of the electronic flight bag further configured to execute a module to perform the first iterative computation of a vertical profile free of constraints as long as a condition dependent on the criterion is not reached, the computer of the flight management system or of the electronic flight bag further configured to execute a module to replace each free level of the constraint-free profile with a permitted level so as to generate an initial constrained profile, and the computer of the flight management system or of the electronic flight bag further configured to execute a module to perform a second iterative computation of a constrained vertical profile as long as a condition dependent on the criterion is not reached, initialized by the initial constrained profile.

20. The device according to claim 19, wherein the computer is further configured to execute a module to display a final constrained vertical profile obtained as output from the second iterative computation and the result of the computation of the criterion obtained for the final constrained vertical profile.

21. The device according to claim 19, wherein the computer is further configured to execute a module to perform an iterative computation comprises:
a trajectory computer using digital integration and for computing associated criterion,
a parametric optimizer.

* * * * *